United States Patent [19]

Scott

[11] Patent Number: 4,462,180

[45] Date of Patent: Jul. 31, 1984

[54] BAIT CONTAINER

[76] Inventor: Kenneth Scott, R.R. #1, Alden, Iowa 50006

[21] Appl. No.: 369,075

[22] Filed: Apr. 16, 1982

[51] Int. Cl.³ .............................................. A01K 97/04
[52] U.S. Cl. .................................... 43/57; 261/121 M
[58] Field of Search ........................... 43/57, 56, 17.5; 261/121 M

[56] References Cited

U.S. PATENT DOCUMENTS

| | | | |
|---|---|---|---|
| 2,898,698 | 8/1959 | Bair | 43/17.5 |
| 2,962,835 | 12/1960 | Clark | 43/56 |
| 3,079,721 | 3/1963 | Smith | 43/17.5 |
| 3,091,882 | 6/1963 | Dudley | 43/56 |
| 3,177,604 | 4/1965 | Ewing | 43/17.5 |
| 3,323,249 | 6/1967 | Randall | 43/57 |
| 3,509,657 | 5/1970 | Bross | 43/57 |
| 3,510,978 | 5/1970 | Murdock | 43/56 |
| 3,815,277 | 6/1974 | Murray | 43/57 |
| 4,020,580 | 5/1977 | Chappell et al. | 43/17.5 |

Primary Examiner—Gene P. Crosby
Attorney, Agent, or Firm—Henderson & Sturm

[57] ABSTRACT

An improved bait holding apparatus for fishing including a housing having a first container disposed therein and a second container disposed within the first container. A light source is connected to the housing and the light therefrom is directed towards a side of the first and second containers. Since the sidewalls of the containers are constructed of transparent or translucent materials, the light shines on the bait and also shines out of the top of the containers for facilitating the baiting of a hook. A second light source is connected to the housing for illuminating the area outside of the container and an aeration pump is provided for selectively replenishing the air in water containing live minnows or the like. A mechanism is also provided for easily using power from the battery of a boat or automobile as a substitute for portable batteries disposed within the housing.

13 Claims, 3 Drawing Figures

U.S. Patent     Jul. 31, 1984     4,462,180
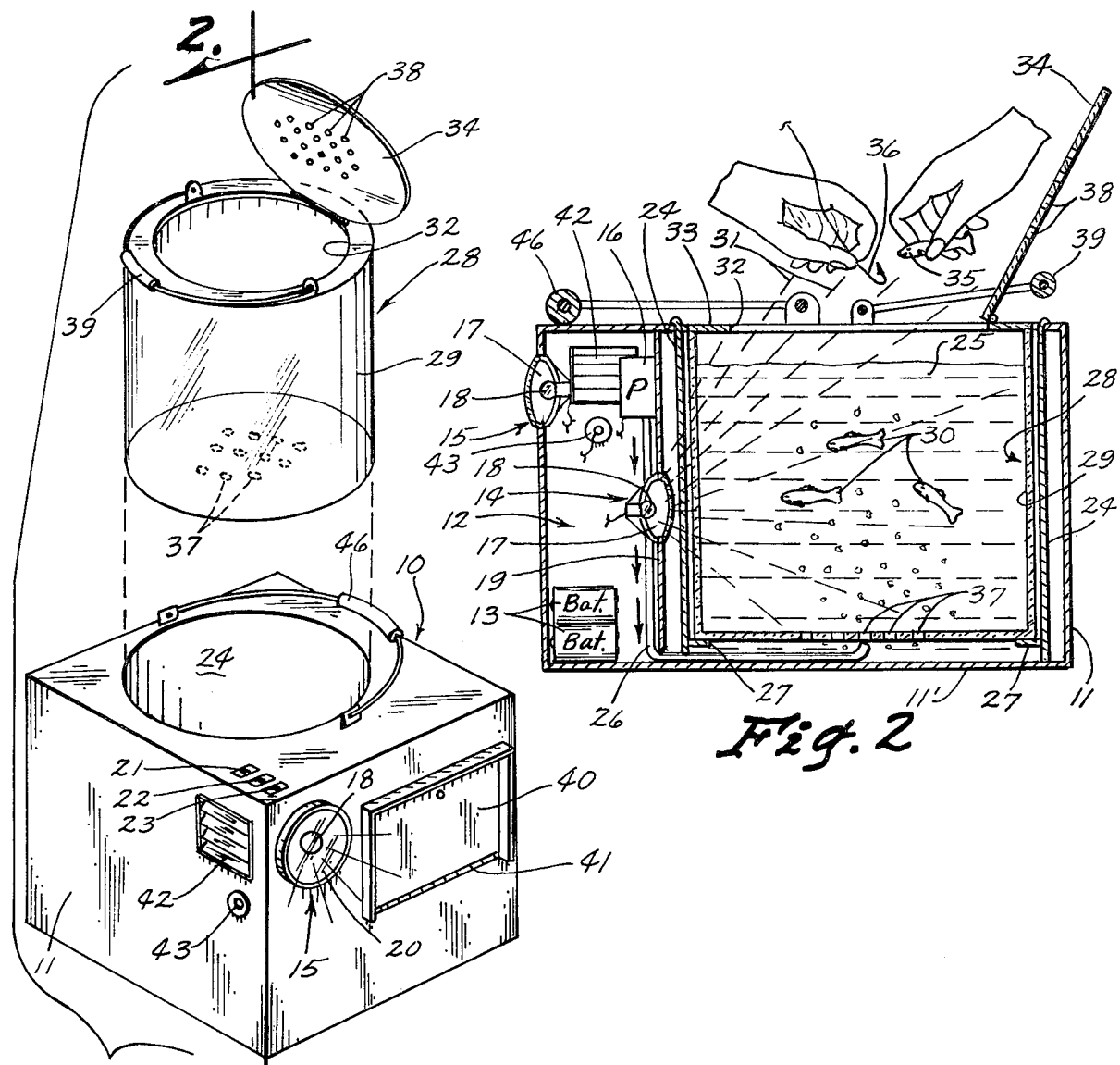
Fig. 1
Fig. 2
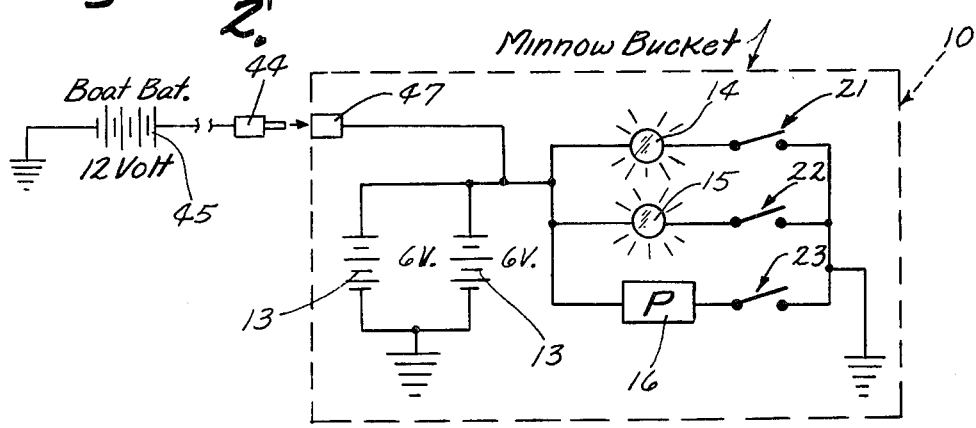
Fig. 3

BAIT CONTAINER

BACKGROUND OF THE INVENTION

Present invention relates generally to bait containers for fishing, and more particularily to an improved bait container which is particularily useful for night fishing.

When fishing at night while using a conventional minnow bucket, a common problem involves how to hold the light for catching the minnow and then continue to use the light to hook the minnow onto the fishing hook, an operation which requires the use of both hands. Each individual fisherman tends to develop his own homespun method of solving this problem. For example when fishing with another person, such second person can hold the flashlight while the first person catches the minnow and baits the hook. When fishing alone, however, it may require that a flashlight be laid on the ground or on a boat seat or even holding the flashlight between a person's knees while catching the minnow and baiting the hook.

Another problem associated with night fishing is getting to and from the favorite fishing hole while carrying all of the equipment necessary and still having a hand available for carrying a flashlight or a light.

Still another problem associated with this type of fishing with minnows is that the minnows use up the oxygen within the water supply in the minnow bucket and therefore will die if this water is not changed or oxygen replenished within such water. A well-known solution to this problem is the provision of an aeration pump which is used to pump air into such water by placing a tube from the pump through the top of a minnow bucket and towards the bottom. The problem is that the aeration pump is just one more piece of equipment needed to be transported and contended with and having a separate power supply from the flashlight carried.

Another common problem with this type of fishing is that one cannot always accurately predict when the battery for a flashlight or aeration pump will run out of power. Consequently, there is a need for some sort of back-up power system such as being able to use the battery from a boat, automobile or truck as the source of supply when such batteries expire.

Consequently, it can be readily appreciated there is a need for an apparatus for fishing which would overcome the problems referred to above.

SUMMARY OF THE INVENTION

The present invention relates to an improved bait holding apparatus for fishing including a housing having a first container disposed therein and a second container disposed within the first container. A light source is connected to the housing and the light therefrom is directed towards the side of the first and second containers. Since the sidewalls of the containers are constructed of transparent or translucent materials, the light shines on the bait and also shines out of the top of the containers for facilitating the baiting of a hook. A second light source is connected to the housing for illuminating the area outside of the container and an aeration pump is provided for selectively replenishing the air in water containing live minnows or the like. A mechanism is also provided for easily substituting the power from the battery of a boat or automobile for portable batteries disposed within the housing.

An object of the present invention is to provide improved bait container for fishing.

Another object of the invention is to provide a lighted bait container for night fishing.

A further object of the invention is to provide an improved bait container which allows a person to easily bait a hook without assistance from another person.

Still another object of the invention is to provide an improved bait container having a light which shines outwardly therefrom.

Still another object of the invention is to provide an improved bait container with a self-contained aeration pump for pumping air to add oxygen to water for minnows or the like.

Still another object of the invention is to provide a power source which can readily be replaced or which can readily be switched to the power source of a boat or automobile battery if the primary power supply source runs out.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective and somewhat exploded view of an improved bait container constructed in accordance with the present invention;

FIG. 2 is a cross-sectional view taken along line 2—2 of FIG. 1 and showing a minnow being placed on a fishing hook; and FIG. 3 is a schematic view of the electrical system of the present invention.

DESCRIPTION OF THE PREFERRED EMBODIMENT

Referring now to the drawings wherein like reference numerals designate identical or corresponding parts throughout the several views, FIG. 1 shows an improved bait container 10 constructed in accordance with the present invention. The improved bait container 10 includes an outer housing 11 which is generally flat on all sides. It is to be understood, however, that the particular shape of the exterior of the housing 11 is not critical and could be of many different configurations. The housing 11 also includes a compartment 12, which can best been seen in FIG. 2, and this housing chamber 12 encloses the apparatus shown schematically within the dash lines of FIG. 3, specifically the two 6-volt batteries 13, the first light emitting mechanism 14, the second light emitting mechanism 15 and the aeration pump 16.

The first and second light emitting mechanism 14 and 15 are essentially like the front end of a flashlight or lantern which have reflective surfaces 17 and bulbs 18 associated therewith. The first light emitting mechanism 14 is mounted rigidly, but removably, to an interior wall 19, which interior wall 19 is rigidly attached to the housing 11. The second light emitting mechanism 15 is rigidly, but removably, attached in a conventional manner to the wall of the housing 11 substantially shown in FIGS. 1 and 2. Each of the light emitting mechanisms 14 and 15 have a front lens cover 20 disposed thereon, which is transparent for allowing the light to pass therethrough and is sealed to prevent moisture from entering and shorting out the electrical system.

Referring to FIGS. 1 and 3, it can be seen that a switch 21 is provided for turning the first light emitting mechanism 14 on or off. A second switch 22 provided for turning the second light emitting mechanism 15 on or off, and a third switch 23 is provided for turning the aeration pump 16 on or off. It is to be understood, of course, that any one, any two or all of the switches 21, 22 and 23 may be opened or closed in any combination desired.

Referring again to FIG. 2, it is noted that the cylindrical walls 24 are sealed to the bottom wall 11 in such a way as to form a sealed container for holding water 25 or the like without having such water leak into the rest of the housing 11. This will also require a seal around the tube 26 which leads from the outlet of the aeration pump 16 to the center of the bottom of the first container 24. An annular member 27 is provided around a bottom portion of the walls 24 for the purpose of elevating a second container 28 and preventing such second container 28 from resting directly upon the lower portion of the aeration tube 26.

The construction of the first and second containers 24 and 28 are very similar to a conventional minnow bucket except that the walls 24 and the walls 29 of the first and second container, respectively, are made of a transparent or translucent material so that the light emitting from the light emitting mechanism 14 can shine through the walls 24, through the walls 29 and into the water 25 so that a person can easily see the minnows 30 disposed within the water 25. Furthermore, the light rays indicated by the numeral 31 also will shine upwardly through an opening 32 in the top 33 of the second container 28 when the lid 34 is opened, for example as shown in FIG. 2. This arrangement of transparent or translucent material in combination with the light emitting mechanism 14 as shown in FIG. 2 allows a person to catch a minnow 30 and then to have light present for placing a minnow, such as the minnow 35, above the apparatus 10 shown in FIG. 2 onto the hook 36. It is noted also that the lid 34 can similarly be made of a transparent or translucent material such that the light rays 31 will pass through the lid 34 even when it is closed.

The container 28, it will be noted, also has a plurality of holes 37 disposed in the bottom thereof for the purpose of allowing air from the aeration pump 16 to pump air through the tube 26 and allow such air to enter through the holes 37 and keep a good supply of oxygen in the water 25 for the reasons set forth above. Additionally, it has been found to be desirable to have a plurality of holes 38 in the top of the lid 34 which is hingedly attached to the top 33 of the container 28. It is noted also that the sidewalls 29 of the container 28 could have holes therein if desired, for example to allow water to empty therefrom more quickly when the container 28 raised upwardly by use of the handle 39 for the purpose of making the minnows 30 easier to catch.

A door 40 is connected by means of a hinge 41 to the housing 11 for the purpose of allowing access to the chamber 12, which is necessary to facilitate assembly, repair or replacement of the parts. The most common use of door 40 is so the batteries 13 can be easily changed. A vent structure 42 is provided on each side of the chamber 12 for the purpose of preventing build-up of moisture within the chamber 12. A female connector 43 is mounted rigidly to the inside of one wall of the chamber 12 for the purpose of receiving a male electrical connector member 44, as shown in FIG. 3. This connector member 44 provides 12-volt power from a boat or automobile battery 45.

When it is desired to use the improved bait holding apparatus 10 of the present invention, normally it would be carried by use of the handle 46 pivotally attached to the housing 11, as shown in FIG. 1. If the water 25 and minnows 30 are already in the first and second containers 28 and 24, then the switch 22 would be activated to allow the second light emitting mechanism 15 to show the person using the apparatus the way to the place where the fishing is to occur, assuming a nighttime condition. Once the person using the apparatus is at the place desired, switch 22 may be opened if the light 15 is no longer needed. When it is desired to follow the hook baiting procedure referred to above, then, of course, the switch 21 is closed and the light 14 will be on for the rest of the baiting procedure. Switch 21 would be opened again after that procedure has been completed.

If at any time it is in the judgment of the person fishing that the water 25 may be getting stale and that the minnows 30 may need more oxygen added to the water 25, the switch 23 can be closed and the pump 16 can be run for whatever period of time desired. If it should happen that the batteries 13 become worn out, the 12-volt battery 45 of a boat, automobile or truck can be easily used instead, by means of the adaptor 44 which is wired to a 12-volt battery 45.

Consequently, it can be appreciated that the preferred embodiment 10 does indeed accomplish the object referred to above. Obviously the modifications and variations of the present invention are possible in light of the above teachings. It is, therefore, to be understood that, within the scope of the appended claims, invention may be practiced otherwise than as specifically described.

I claim:

1. An improved bait holding apparatus for fishing comprising:
    a housing;
    container means disposed within said housing for holding water and fishing bait, said container means including a continuously sealed bottom wall, continuously sealed sidewalls and a top access opening means attached to the top of the sidewalls for providing manual access to bait disposed within said container means, at least a portion of said sidewalls including light transmission means for permitting light to pass therethrough; and
    light emitting means attached to said housing adjacent to said light transmission means portion of said container means for directing light rays through said light transmission means portion and into said container means for illuminating the interior of said container means.

2. The apparatus of claim 1 including second container means disposed within said first container means, said second container means having a bottom wall, sidewalls and a top access means connected to the sidewalls for permitting manual access to the interior thereof, at least the portion of the sidewall adjacent to the light transmission means portion of the first said container means including means for allowing light to pass therethrough for illuminating the interior of said second container means by use of said light means.

3. The apparatus of claim 2 wherein the light transmission means of said first container means comprises sidewalls made of translucent or transparent materials.

4. The apparatus of claim 3 wherein said means for allowing light to pass through at least a portion of the sidewall of said second container means comprises said sidewalls being made of translucent or transparent materials.

5. The apparatus of claim 4 wherein said second container means has holes smaller than most minnows for permitting water in the first container means to flow into or out of said second container means through said holes.

6. The apparatus of claim 5 including means for permitting said light emitting means to shine through water in said first and second container means and through said top access means of said second container means whereby the light will shine on a hook and minnow disposed just above said top access means in second container means for facilitating placing the minnow on the hook.

7. The apparatus of claim 6 wherein said top access means comprises a top opening and a lid means for selectively opening or closing said top opening.

8. The apparatus of claim 1 including a second light emitting means connected to said housing for transmitting light out of said housing.

9. The apparatus of claims 1 or 8 including aeration means for pumping air into the bottom of said first and second container means for adding oxygen to the water disposed therein.

10. The apparatus of claim 9 including power means including at least one electric battery and switch means for selectively connecting said battery to one or more or all of said first and second light emitting means and said aeration means for selective operation thereof.

11. The apparatus of claim 10 wherein said power means comprises two six volt batteries connected in series to produce a twelve volt output from said power means and wherein each of said light emitting means and said aeration means being connected in a circuit with said power means to be operative on twelve volt power, and further including means for connecting a twelve volt battery from a boat or an automobile to said circuit if said batteries have lost their power.

12. The apparatus of claim 11 including chamber means connected to said housing for holding at least a portion of each of said power means, first and second light emitting means and said aeration means.

13. The apparatus of claim 12 including door means for allowing access to said chamber means and vent means connected to said chamber means for preventing moisture from accumulating in said chamber means.

* * * * *